Aug. 6, 1935.     H. W. TINKER     2,010,770
TIRE COVER
Filed Oct. 26, 1931     2 Sheets-Sheet 2
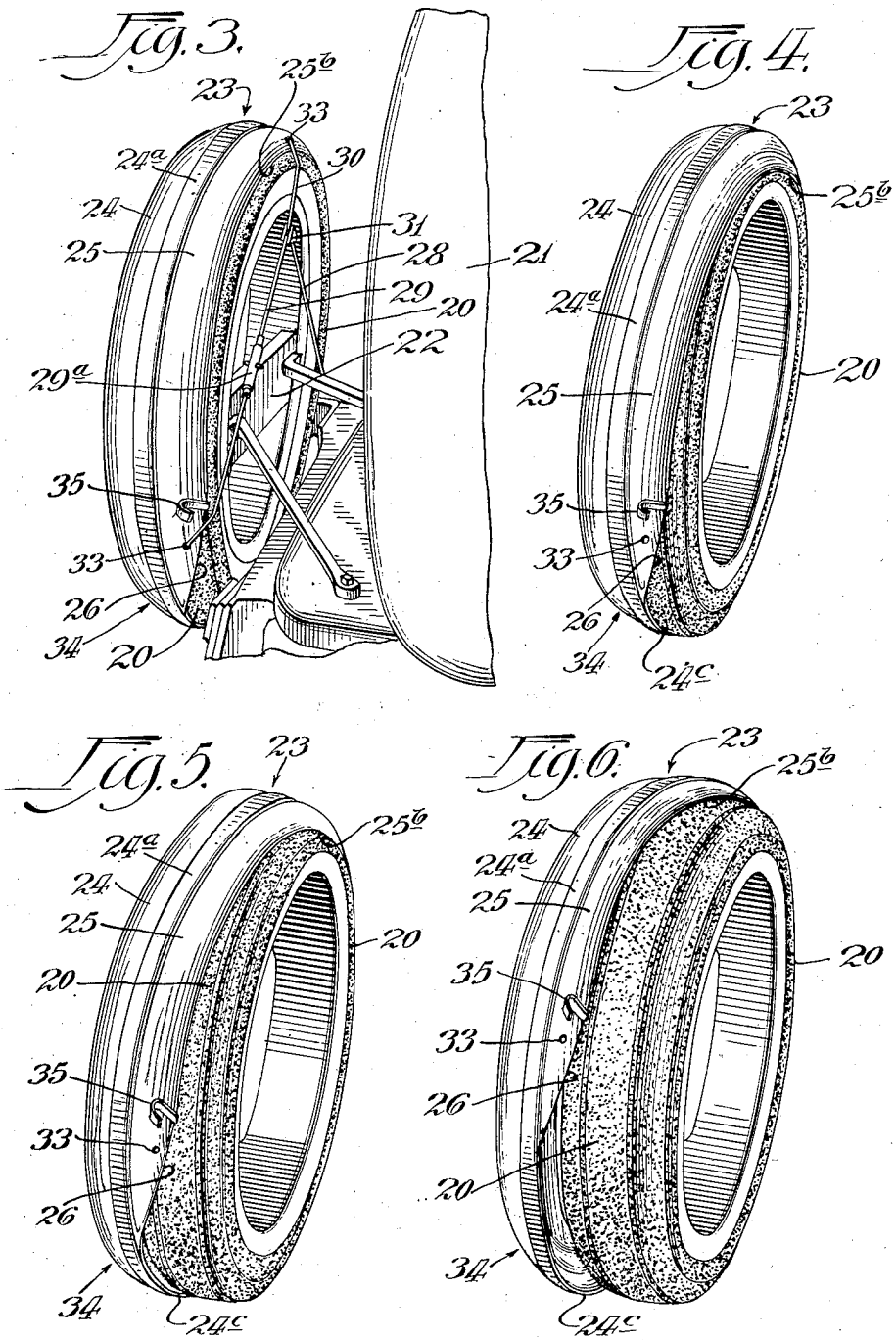

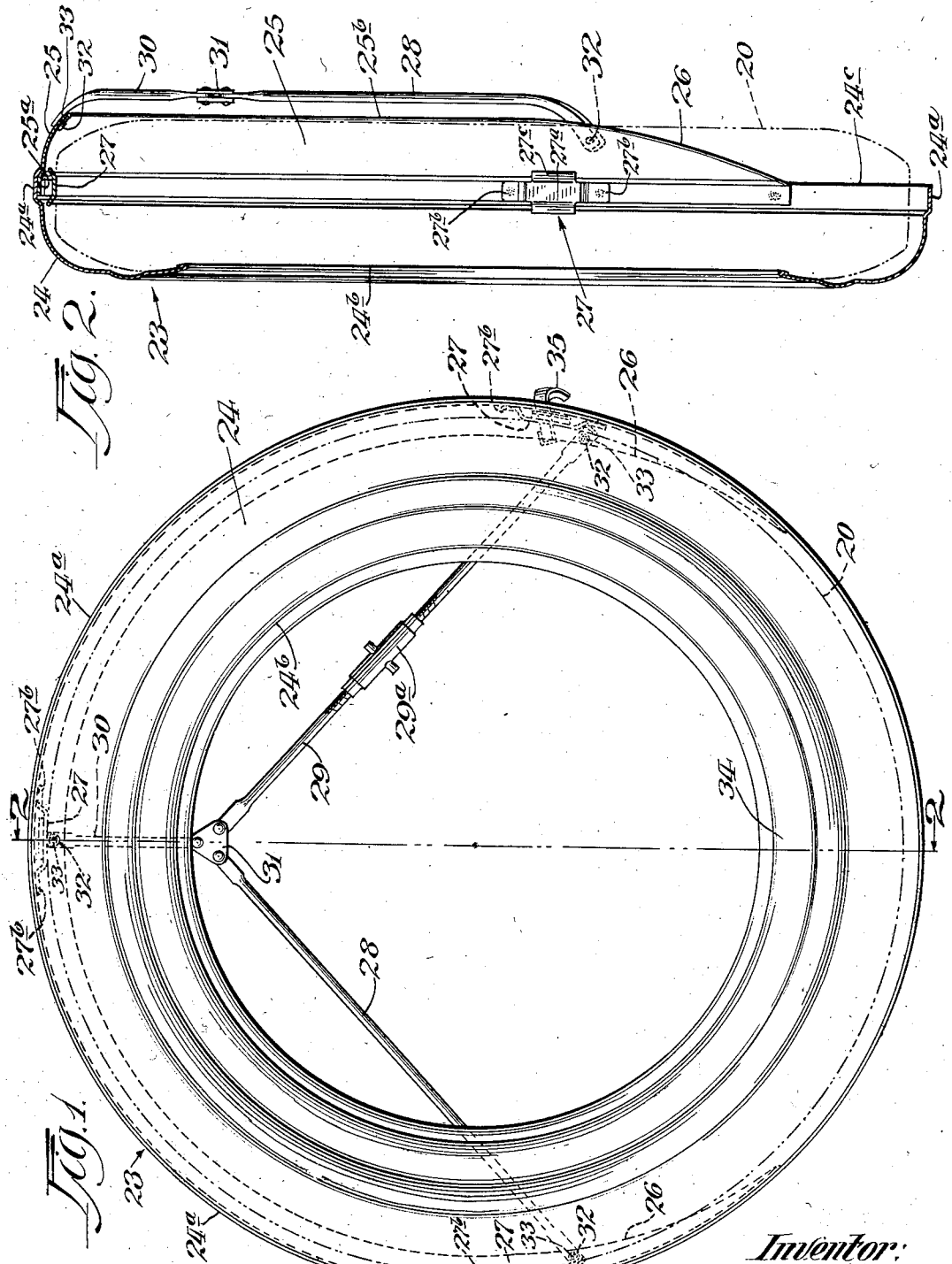

Patented Aug. 6, 1935

2,010,770

UNITED STATES PATENT OFFICE 2,010,770

TIRE COVER

Herbert W. Tinker, Milwaukee, Wis., assignor, by mesne assignments, to Lyon Incorporated, Detroit, Mich., a corporation of Delaware Application October 26, 1931, Serial No. 571,092

13 Claims. (Cl. 150—54)

My invention relates to metal covers for spare tires for automobiles and the like.

One of the objects of my invention is to provide a novel unitary tire cover which has approximately the transverse and circumferential curvatures of the tire, which is durable and inexpensive, and which may be readily and quickly applied to and removed from the tire as a single unit.

Another object is to provide a tire cover of the foregoing character which is shaped and sized to shield and conceal one entire face of the tire, the entire tread of the tire for the greater portion of its circumference and a substantial part of the tread for the remainder of its circumference, the transverse and circumferential dimensions of the cover being such relative to the corresponding tire dimensions that the cover must be sprung on and off the tire.

A more specific object is to provide a single-unit, metal cover formed of two integrally-joined sections, the outer of which sections consists of a completely circular and continuous ring shaped transversely and circumferentially to the transverse and circumferential curvatures of a tire face and the portion of the tire tread adjacent thereto, and the inner of which sections is formed parti-circular in elevational profile with a transverse and circumferential shape corresponding to the transverse and circumferential curvatures of the greater part of the remainder of the tire tread.

A further object is to provide a novel form of tire cover having a tread covering portion adapted to extend throughout the circumference of the tire, and adapted for a greater portion of its circumference to extend entirely across the tire tread with its transversely spaced edges located on opposite sides of and radially inward of the circumferential center line of the tire; and to provide in conjunction with the foregoing means whereby the cover may be sprung on and off the tire.

Additional objects are to provide a cover of the foregoing character which may be applied and removed without removing the tire from its support; to provide a cover of greater diameter along its circumferential center line than the corresponding diameter of the tire with means for centering the cover on the tire; and to provide clamp means adapted to contract the inner edge of the cover at a plurality of points on the opposite sides of the diametrical center line of the tire to uniformly clamp the cover into non-slip engagement with the tire.

Other objects and advantages will become apparent as this description progresses and by reference to the drawings wherein,—

Figure 1 is a front elevational view of one form of tire cover embodying my invention;

Fig. 2 is a section taken substantially on line 2—2 of Fig. 1 and diagrammatically illustrating its relation to the tire;

Fig. 3 is a reduced perspective view of a rear-mounted spare tire having a cover embodying my invention applied thereto;

Fig. 4 is a perspective view of the tire and cover of Fig. 3 and illustrating the first stage of removal of the cover;

Fig. 5 is a view similar to Fig. 4 except showing an advanced stage of cover removal; and Fig. 6 is a view similar to Figs. 4 and 5 except showing the cover in a final stage of removal and in condition to be lifted from the tire.

Covers embodying my invention are adapted to shield one face of the spare tire and a substantial part of the tire tread; wherefore, they are particularly adapted to spare tires mounted either in a vertical or inclined plane and in fully-exposed position at the rear or sides of the automobile. However, it is to be understood that my invention has utility in any environment where the advantages afforded thereby are desired.

In Fig. 3 of the drawings I have illustrated my invention in its application to a spare tire 20 supported at the rear of the automobile body 21 by suitable bracket and carrier structure 22. The tire supports a cover (indicated generally at 23) of such size and shape that it shields and substantially conceals the entire outer face of the tire, the entire tire tread for a greater portion of its circumference, and a substantial part of the tire tread for the remainder of its circumference. The cover construction is such that, even with the tire mounted in an inclined plane the desired tire concealment is provided.

The cover 23 is to all intents and purposes a single-unit or one piece having, for the greater portion of its circumference, approximately the same transverse and circumferential curvatures as the tire; however, to facilitate manufacture, this cover is preferably made up of a so-called outer section 24 and an inner section 25 (Fig. 2), which sections are each formed along one edge with offset circumferential ridges 24ᵃ and 25ᵃ permanently joined together by welding, or the like, in nested relationship to complete the unit.

Specifically, the outer section 24 takes the form of a completely circular and continuous ring shaped transversely and circumferentially to substantially the transverse and circumferential curvatures of the outer tire face and the adjacent half portion (preferably) of the tire tread (Fig. 2). The inner section 25 takes the form of a split, parti-circular piece having the same general transverse and circumferential curvatures as the remainder of the tire tread. When these two sections are joined together as described they provide an integral body construction having a transverse dimension which, throughout the greater portion of the tire circumference, projects the outer and inner marginal edges 24b and 25b thereof a substantial distance beyond the circumferential center line of the tire to cover and conceal the tire tread substantially throughout its width. The radii of the marginal edges 24b and 25b are less than the radius of the tire tread at its circumferential center line so that the cover cannot be moved from the tire merely by lateral or axial movement thereof.

The circumferential length of the inner section 25 is such that the opposite ends of this section project a substantial distance below the horizontal diameter of the tire; and the chord line distance between the ends of this section is less than the diameter of the tire. For a purpose which will become obvious hereinafter, each end of the inner section 25 is cut away as at 26 on a line extending from the end of the ridged edge 25a diagonally upward and outward, and the upper end of such cutaway portion terminates in the marginal edge 25b at a point spaced below the diameter of the tire so that the full-width length of this section is long enough to extend, at both sides of the tire, below the tire diameter. With this arrangement, the cover cannot be removed by merely lifting the same directly upward away from the tire. This removal movement is further hindered by the outer section 24, the tread-covering portion of which passes under the lower part of the tire tread.

It will be appreciated that, in addition to the covering advantages afforded by the above-described structure, the cover should be arranged for ready and quick removal. The slight flexibility of the cover as a whole aids in the accomplishment of this feature. To further facilitate the application and removal of the cover, the diameter of the same along its circumferential center line is greater than the diameter of the tire along its corresponding center line. The cover is also of such tread-covering width that it may be rocked and shifted laterally upon the tire.

To accommodate the larger diameter of the cover and to center the same upon the tire, I provide, preferably, three metal pads 27 of equal depth, one of which pads is at the top of the cover and the other two are at opposed points below the horizontal diameter of the tire. These pads take the form of a body portion 27a supported in a raised position by L-shaped legs 27b which are welded, or otherwise secured, to the joint between the inner and outer sections 24 and 25. The body portion 27a is provided with side wings 27c which extend diagonally inward toward the inner surface of the cover and serve as guides or deflecting edges preventing the pads from catching the tire when the cover is applied thereto. This arrangement leaves the bottom of the cover free so that the cover may be lifted vertically to an extent equal to the depth of the pads 27.

To avoid unintentional slipping and movement of the cover on the tire, which would tend to result in needless wear of the tire and cover, as well as rattling and impaired appearance, I provide means for contracting the cover into snug-fit engagement with the tire. Specifically, I employ a triple arm clamp structure having two long arms 28, 29 and a relatively shorter arm 30 all pivotally connected together by a triangular-shaped pivot-plate 31. The free end of each arm is slightly inturned and is provided with a head 32 projecting at right angles thereto. Each of these heads is adapted to engage in an opening 33 formed in the cover adjacent the marginal edge 25b. One of these openings is located at the top of the cover and the other two are located preferably, adjacent the upper end of the diagonal cut 26 below the horizontal diameter of the tire. The arm 29 is provided with a turnbuckle adjustment device 29a for varying the length of the same. Arm 29 is lengthened by adjustment of the turnbuckle to readily engage the clamp arms with the cover, and it is then shortened by adjustment of the turnbuckle to flex the inner edge of the inner section 25 inwardly and move the cover as a whole laterally and radially into firm contact with the tire (Fig. 3).

To remove the cover, assuming that it is secured in place upon the tire as shown in Fig. 3, the clamp structure is first removed. The next step involves the grasping of the front lower portion of the cover as at 34 (Fig. 1) and pulling outwardly thereon to rock the cover upon the tire to substantially the position shown in Fig. 4. The excess width of the tread-covering portion of the cover and the larger diameter thereof readily permit of this. As this action takes place, the top spacer pad 27 is also rocked rearwardly across the circumferential center of the tire and it aids somewhat in holding the cover in position for further removal manipulation. In the position of the cover shown in Fig. 4, the narrow, bottom tread-covering portion of the outer section is moved outwardly beyond the circumferential center of the tire with its marginal edge 24c positioned along the outward and upwardly curving wall of the tire, thereby permitting further vertical movement of the cover. The cover is provided with a finger hook 35 located adjacent the upper end of the diagonal cut 26 at one end of the inner section, and the foregoing manipulation is followed by grasping this hook and pulling upwardly and outwardly thereon to slightly flex the inner section of the cover. When this is done, it appears to me that there is a slight distortion of the cover as a whole from one end of the inner section to the other, and the entire action results in an upward and outward slide movement of the cover upon the tire to a position such as illustrated in Fig. 5. Continuation of the composite upward and outward thrust movement of the hook 35 brings the cover eventually to the position of Fig. 6 wherein the full-width ends of the inner sections are above the diameter of the tire and the cover may be freely lifted from the tire. The oblique edges 26 along the inner edge of the cover facilitate the foregoing manipulation by reducing the extent of raising and flexing of the cover necessary to free the same from the tire.

The cover may be applied to the tire by a composite downward and axial movement thereof and by a flexing of the inner cover section. More particularly, the top part of the cover is first placed over the top of the tire as far as possible within the existing dimensional limitations. It is then pressed, by pressure applied to its outer face, toward the tire by a composite axial and downward movement with sufficient force to flex the inner part of the cover and snap the same over the tire tread.

From the foregoing it will be obvious that my invention is well adapted for the accomplishment of the objects and advantages hereinabove stated. It will be understood that while I have shown and described only one form of cover embodying my invention, changes in details and arrangement of parts may be made without departing from the spirit and scope of my invention as defined by the claims which follow.

I claim:

1. An integral tire cover structure of substantially form-retaining material comprising a body shaped to conform to substantially the transverse and circumferential curvatures of the tire, said body having a completely circular and continuous portion formed to cover one face of the tire, a completely circular and continuous portion formed to cover transversely a substantial part of the tire tread adjacent the covered tire face, and a parti-circular portion joined throughout one edge thereof to said second-named portion and formed to cover transversely the remainder of the tire tread for more than one-half of the circumference of the tire.

2. An integral metal tire cover structure comprising a body shaped to conform to substantially the transverse and circumferential curvatures of the tire, said body having a completely circular and continuous portion formed to cover one face of the tire, a completely circular and continuous portion formed to cover transversely a substantial part of the tire tread adjacent the covered tire face, and a parti-circular portion secured throughout one circumferential edge thereof to said second-named portion and formed to cover transversely a major portion of the remainder of the tire tread, said parti-circular portion being of a length to project its ends below diametrically opposite tread parts of the tire, and the radius of the free longitudinal marginal edge of said third portion being substantially less than the radius of the tire tread at the circumferential center of the tire.

3. An integral metal tire cover structure comprising a body shaped to conform to substantially the transverse and circumferential curvatures of the tire, said body having a completely circular and continuous portion formed to cover one face of the tire, a completely circular and continuous portion formed to cover transversely a substantial part of the tire tread adjacent the covered tire face, and a parti-circular portion secured throughout one circumferential edge thereof to said second-named portion and formed to cover transversely a major portion of the remainder of the tire tread, the ends of said parti-circular portion being cut away on lines extending from said second-mentioned continuous portion diagonally upward to the longitudinal marginal edge of said third portion and terminating at each end of the parti-circular portion below diametrically opposite tread parts of the tire when the cover is in proper tire protecting position.

4. A unitary metal tire cover having substantially the transverse and circumferential curvatures of the tire and formed of a plurality of integrally united sections which comprise a circular and continuous outer section formed to extend over a face and transversely over a substantial part of the adjacent tire tread throughout its circumference, and a parti-circular inner section secured throughout one circumferential edge thereof to said outer portion and formed to extend over the remainder of the tire tread for more than one-half the circumference of the tire, said inner section being of such dimensions relative to the tire that the chord line distance between its ends is less than the diameter of the tire, and the radius of its inner and free edge is substantially less than the radius of the tire tread.

5. A unitary metal tire cover having substantially the transverse and circumferential curvatures of the tire and formed of a plurality of integrally united sections which comprise a circular and continuous outer section formed to extend over a face and a substantial part of the adjacent tire tread throughout its circumference, and a parti-circular inner section having one edge integrally joined to said outer section and formed to extend over the remainder of the tire tread for more than one-half the circumference of the tire, the joined portion of said inner section being of such dimensions relative to the tire that the chord line distance between its ends is less than the diameter of the tire, the radius of its inner and free edge is substantially less than the radius of the tire tread, and said inner section having its ends cut away on lines extending from said outer section diagonally upward to the free edge of said inner section at points below diametrically opposite tread parts of the tire when the cover is in proper tire protecting position.

6. A unitary metal tire cover comprising a body having one portion formed completely circular and continuous for disposition over one face of the tire and a substantial part of the adjacent tire tread surface throughout the circumference thereof, another portion formed parti-circular with a circumferential length greater than one-half the circumference of the tire and permanently united along one edge to said one portion for more than one-half the circumference of said one portion, said other portion covering transversely the remainder of the adjacent tire tread surface, said body being of such transverse and circumferential shape and dimensions that its diameter along its circumferential center line is greater than the diameter of the tire along its corresponding center line, and the radius of the longitudinal marginal edge of said other portion is less than the radius of the tire tread, and means for flexing and holding said body in close-fit engagement with the tire.

7. A metal tire cover bodily movable onto and off a spare tire and having a flexible circular body shaped transversely to cover one face of the tire and the tire tread surface and having its tread-covering portion shaped to conform to the transverse and circumferential curvatures of the tire tread with a free edge portion projecting inwardly of the tire tread, the dimensions of said body being such relative to the tire dimensions that the cover is normally freely slidable around and over the tire, a plurality of clamp arms disposed in angular relation with respect to each other and having their ends formed for detachable engagement with said free edge portion, a member to which each of said arms is pivotally connected, and means for adjusting the length of one of said arms to simultaneously move all said arms to flex said tread covering portion throughout into snug-fit relation with the tire and to adjust said body to slight variations in the contour and size of the tire.

8. A tire cover of substantially form-retaining material having a flexible circular body shaped transversely to cover one face of the tire and the greater portion of the tire tread circumference and having its tread-covering portion shaped to conform to the transverse and circumferential curvatures of the tire with an inner free edge formed on a radius less than the radius of the tire, the diameter of said tread-covering portion along its circumferential center line being normally greater than the corresponding diameter of the tire, members supported along the greater diameter portion of said tread-covering portion at the top thereof above, and at the sides thereof below, lateral diametrically opposite parts of the tire, and freely engageable with the tire tread to support and center the cover thereon with the ability to be moved upwardly on the tire, and means engageable with said free edge at a plurality of points and simultaneously adjustable at all such points for snugly seating the cover upon the tire against free movement thereof and to adjust said body to slight variations in the contour and size of the tire.

9. A spare tire cover comprising a circular, form-retaining member shaped circumferentially and transversely to conform to and cover substantially the entire front face, and diametrically opposite upper and lower peripheral portions of the tread of the tire, the upper tread covering part extending substantially entirely across the tread and having its free rear margin extending inwardly of the tread to thereby prevent removal of the cover by an axial movement thereof, the lower tread covering part serving to prevent removal of the cover by an upward movement in its own plane, whereby said cover holds itself in proper tire protecting position and is removable only by a combined upward swinging and lifting operation, and spacing means comprising an element carried interiorly by said upper part and engageable with the tire tread to space said upper part from the tread and arranged rearwardly of the face covering part of the cover so as to be moved rearwardly and engage behind and be held from forward movement by the tread as the lower part is swung forwardly free of the tread, to thereby prevent return of the lower part so that the cover may be raised directly bodily off the tire.

10. A spare tire cover comprising an arcuate portion shaped to cover the front wall of a tire and to extend transversely substantially half across the tread throughout the circumference thereof to thereby cover substantially one-half of the exposed surface of the tire, a second arcuate portion connected to the first portion throughout more than 180° and extending therefrom rearwardly across the remainder of the tread and then inwardly of the outer periphery of the tread, the connection between said portions extending peripherally adjacent the center line of the tread and being channeled to provide an inner peripheral pocket, and bowed pads carried in and extending longitudinally of said pocket and projecting inwardly therefrom to space and center the second portion relative to the tire.

11. A spare tire cover comprising an arcuate portion shaped to cover the front wall of a tire and to extend transversely substantially half across the tread throughout the circumference thereof to thereby cover substantially one-half of the exposed surface of the tire, a second arcuate portion connected to the first portion throughout more than 180° and extending therefrom rearwardly across the remainder of the tread and then inwardly of the outer periphery of the tread, the connection between said portions extending peripherally adjacent the center line of the tread and being channeled to provide an inner peripheral pocket, and circumferentially spaced cushion means carried in and projecting inwardly from said pocket to space and center the second portion relative to the tire, said means having convex tread engaging surfaces to enable the same to readily slide along and transversely of the tread without biting thereinto as the cover is applied to and removed from the tire.

12. A spare tire cover comprising an arcuate portion shaped to cover the front wall of a tire and to extend transversely substantially half across the tread throughout the circumference thereof to thereby cover substantially one-half of the exposed surface of the tire, a second arcuate portion connected to the first portion throughout more than 180° and extending therefrom rearwardly across the remainder of the tread and then inwardly of the outer periphery of the tread, the connection between said portions extending peripherally adjacent the central line of the tread and being channeled to provide an inner peripheral pocket, and circumferentially spaced cushion means carried in and projecting inwardly from said pocket to space and center the second portion relative to the tire, said means having convex tread engaging surfaces to enable the same to readily slide along and transversely of the tread without biting thereinto as the cover is applied to and removed from the tire, said second portion being formed to be expanded and contracted in diameter, and means for contracting said second portion to cause said cushion means to yieldably engage the tread and thereby enable the cover to accommodate slight variations in the contour and size of the tire.

13. A spare tire cover of flexible form-retaining sheet material including a tread covering portion, a plurality of angularly arranged clamp arms connected together at the rear side of the cover and having their outer ends connected to said tread portion, and means for adjusting the effective length of one of said arms to adjust simultaneously all of said arms and to flex said tread portion inwardly of the outermost periphery of the tire and into cover retaining engagement with the tire.

HERBERT W. TINKER.